(12) United States Patent
Imaizumi

(10) Patent No.: US 7,570,378 B2
(45) Date of Patent: Aug. 4, 2009

(54) COMMUNICATION DEVICE

(75) Inventor: Hideaki Imaizumi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 794 days.

(21) Appl. No.: 10/367,744

(22) Filed: Feb. 19, 2003

(65) Prior Publication Data

US 2004/0036925 A1 Feb. 26, 2004

(30) Foreign Application Priority Data

Feb. 18, 2002 (JP) .............................. 2002-039534

(51) Int. Cl.
*G06F 3/12* (2006.01)
*G06K 15/00* (2006.01)
*G06K 1/00* (2006.01)
*H04N 1/46* (2006.01)

(52) U.S. Cl. .................... 358/1.15; 358/1.16; 358/3.07; 358/528; 358/1.2

(58) Field of Classification Search ................ 358/1.15, 358/1.16, 3.07, 1.2, 528
See application file for complete search history.

(56) References Cited

U.S. PATENT DOCUMENTS

| 5,970,169 | A | * | 10/1999 | Ittner | 382/160 |
| 5,991,816 | A | * | 11/1999 | Percival et al. | 709/247 |
| 6,665,841 | B1 | * | 12/2003 | Mahoney et al. | 715/520 |
| 6,687,742 | B1 | * | 2/2004 | Iwazaki | 709/206 |
| 6,873,428 | B1 | * | 3/2005 | Yamauchi et al. | 358/1.15 |
| 2002/0054335 | A1 | * | 5/2002 | Sekiguchi | 358/1.15 |

* cited by examiner

Primary Examiner—Edward L Coles
Assistant Examiner—Thomas J Lett
(74) Attorney, Agent, or Firm—Rabin & Berdo, P.C.

(57) ABSTRACT

The data sending and receiving controller (104) of sender's communication device (100) sends data with its mode information such as graphic resolution to receiver's communication device (200). The operator at receiver's communication device occasionally requests for re-sending once received data according to the mode information received with the data when the receiver is not satisfied with the data because its resolution is too low etc. The sender's communication device (100) analyzes the content of request and re-sends data with the mode corresponding to the content of request when it is sent from the receiver's communication device (200).

46 Claims, 10 Drawing Sheets

Fig.5

GRAPHIC ASSIGN
GRAPHIC ID: *000#0003285#

GRAPHIC MODE ABLE TO SEND
① 600dpi × 600dpi : *001#06#
② 300dpi × 300dpi : *001#04#

PHONE NUMBER FOR POLLING: 03 456 7890

*Fig.7*

| DATA FORMAT OF GRAPHICS TO SEND | |
|---|---|
| GRAPHIC ID | 0 0 0 3 2 8 5 |
| GRAPHIC MODE (RESOLUTION) | 600 × 600 |
| GRAPHIC MODE (COMPRESSION FORM) | MMR |
| GRAPHIC MODE | ...... |
| ~ | ~ |
| GRAPHIC DATA | |

Fig.9

| DATA FORMAT OF GRAPHICS WITH VALID PERIOD | |
|---|---|
| GRAPHIC ID | 0 0 0 3 2 8 5 |
| VALID PERIOD | 200111301200 |
| GRAPHIC MODE (RESOLUTION) | 600 × 600 |
| GRAPHIC MODE (COMPRESSION FORM) | MMR |
| GRAPHIC MODE | ...... |
| ~ | ~ |
| GRAPHIC DATA | |

Fig.10

```
ASSIGNMENT OF GRAPHICS
GRAPHIC ID:   *000#0003285

GRAPHIC MODE ABLE TO SEND
    ①600dpi × 600dpi :  *001#06
    ②300dpi × 300dpi :  *001#04

PHONE NUMBER FOR POLLING : 03  456  7890

VALID PERIOD OF
ACCUMULATED GRAPHICS : 11/30/2001   12:00
```

COMMUNICATION DEVICE

BACKGROUND OF THE INVENTION

1. Field of the Invention

The present invention relates to a communication device for sending or receiving data which quality differs with communication mode such as resolution of graphic data.

2. Description of the Related Art

When a certain data is sent from the sender to the receiver by a certain communication device, the quality of the data received by the receiver is not always same. It changes into high quality or low quality as the mode of communication changes.

In this occasion, generally speaking, the cost for communication goes up as the quality of data becomes higher. And usually the sender is charged for communication.

Therefore, the sender wants to cut down expenses. As a result, data is likely to be sent at low quality. On the contrary, the receiver wants to receive data at high quality as possible. As a result, the receiver is often unsatisfied with the data received form the sender.

As an example of data which is sent by this kind of communication device, there is a graphic data. And, as the most familiar communication device for sending or receiving graphic data, generally facsimile is known well. As for facsimile, usually reading mode is selected at the device of the sender. Then, the read data is sent to the device of the receiver. Thus, in the communication process of facsimile, usually the operator of sender selects the reading and sending mode (graphic resolution etc.). In this occasion, reading is performed with high resolution. On the other hand, sending is performed with low resolution because the sender wants to cut down communication cost.

However, the receiver may not be satisfied with the result of the communication when it is processed in the mode assigned by the operator of the sender. For example, the receiver may want to have the graphic data been sent with higher resolution rather than that of the received graphic data. In this occasion, in the conventional technique, the receiver telephoned the sender to request for re-sending the graphic data with higher resolution. Then, the sender re-sent it according to the receiver's request, scanning the manuscript again with enough resolution and sending the read data with higher resolution. So, this conventional process bothered the sender. On the other hand, there is another problem that the receiver could not get the graphics the receiver wanted in a short time, when the receiver requested for re-sending.

SUMMARY OF THE INVENTION

Therefore, the present invention aimed at providing a communication device which is able to re-send the data once received in a short time as possible without bothering the sender.

To achieve this object, the communication device of the present invention adopts the configuration comprising a data container to contain data to be sent; an appending information holding section to hold appending information corresponding to the data to be sent; and a data sending and receiving controller to send the data with the appended information and to re-send the data which is necessary to be sent again, taking out of the data container, when the data re-sending request is based on the appended information is received from the other communication device.

Moreover, the communication device of the present invention adopts the configuration comprising a data receiving controller to receive data and appended information corresponding to the data from the other communication device, and a re-send request indicator to indicate the request based on the appended information to the other communication device to re-send the data which was once received.

BRIEF DESCRIPTION OF THE DRAWINGS

FIG. 5 shows an example of printing of appended information for polling.

FIG. 7 shows a data format of graphic data for sending.

FIG. 9 shows a format of graphic data of Embodiment 2.

FIG. 10 shows an example of printing of polling appended information of Embodiment 2.

DETAILED DESCRIPTION OF THE PREFERRED EMBODIMENTS

Hereafter, the embodiments of communication device according to present invention will be described referring to the appended drawings. In these embodiments, the communication device of present invention is embodied in facsimile device.

Embodiment 1

<Configuration>

Figure 1:
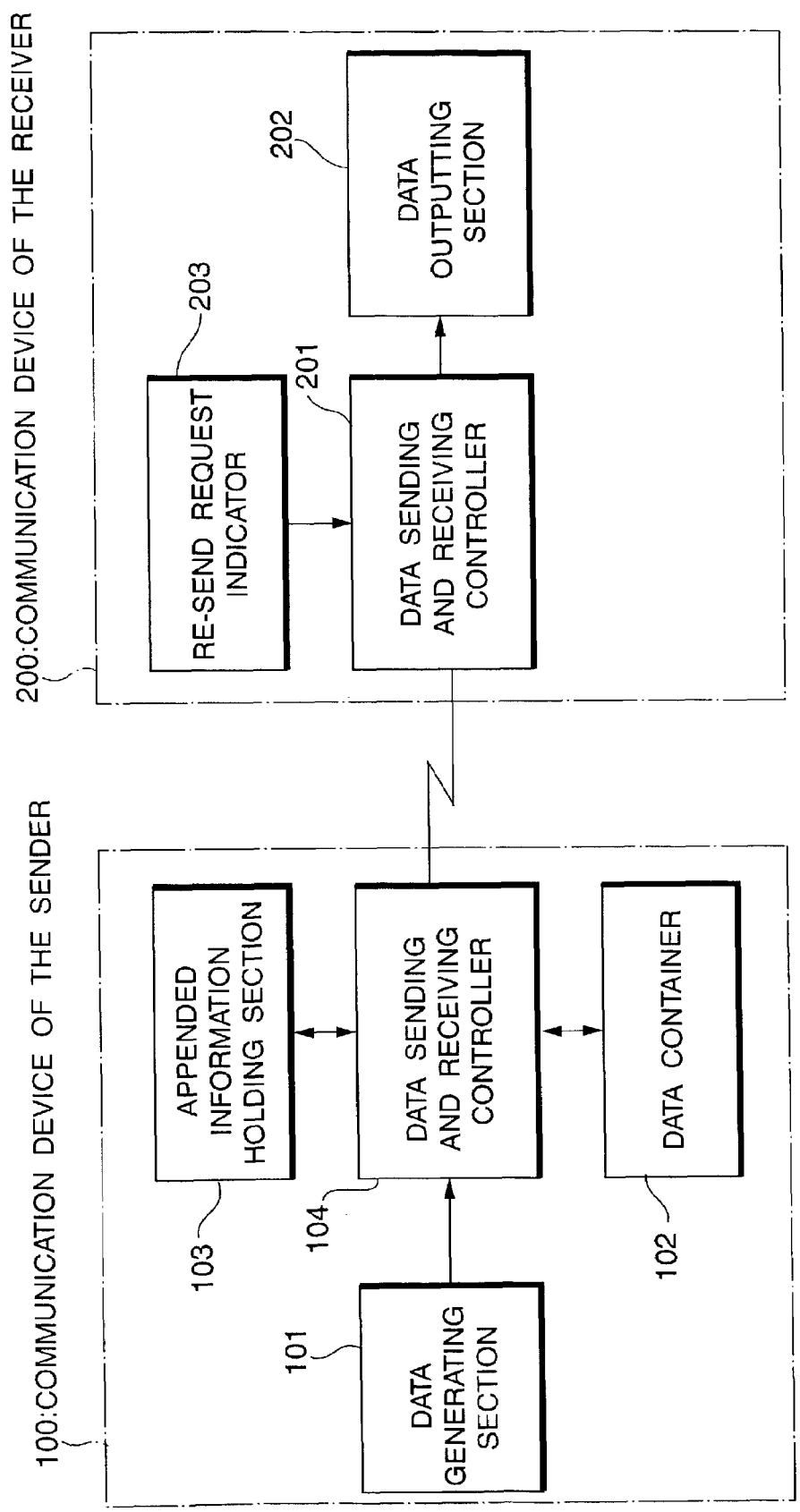
FIG. 1 is a block diagram showing Embodiment 1 of a pair of communication devices according to present invention each of which belong to the sender and the receiver respectively.

The configuration of Embodiment 1 of present invention is described referring to a pair of communication devices shown in FIG. 1.

In FIG. 1, a communication device of the sender 100 comprises a data generating section 101, a data container 102, an appended information holding section 103, and a data sending and receiving controller 104. Moreover, a communication device of the receiver 200 comprises a data sending and receiving controller 201, a data outputting section 202, and a re-send request indicator 203.

The data generating section 101 of the sender's communication device 100 is what has a function of generating graphic data to be sent by the sender's communication device 100. An example of this is a scanner.

The data container 102 is a memory for containing the data generated by the data generating section 101 or the data sent from a host device (host computer etc.). These data are sent by the data sending and receiving controller 104. And, after being sent, the data is still remained in the data container 102.

The appended information holding section 103 is a memory for holding sending mode information such as graphic resolution etc. concerning to the data to be sent.

The data sending and receiving controller 104 sends data and its mode information, namely the appended information, to the receiver's communication device 200. And, it receives a re-sending request (sending request by polling, or transmission of information regarding the communication) corresponding to the mode information from the receiver's communication device 200, when the receiver requests re-sending. On this occasion, it recognizes the data form of the data to be re-sent. Here, the data form includes mode information as shown in FIG. 7. And, the data sending and receiving controller 104 takes out the data from the data container 102 according to the mode information including the graphic resolution, so as to re-send the data to the receiver.

Next, the configuration of receiver's communication device 200 is described.

The data sending and receiving controller 201 receives the data with its mode information form the sender's communication device 100. And, it sends a re-sending request to the sender's communication device 100 when it is indicated to send re-sending request (by polling) from the re-send request indicator 203.

The data outputting section 202 is an outputting device such as a printer etc. to put out the data with its mode information received by the data sending and receiving controller, so as to present for an operator of the receiver.

The re-send request indicator 203 accepts the re-sending request according to the mode information from the operator of the receiver. And, it indicates the data sending and receiving controller 201 to send the request.

Figure 2:
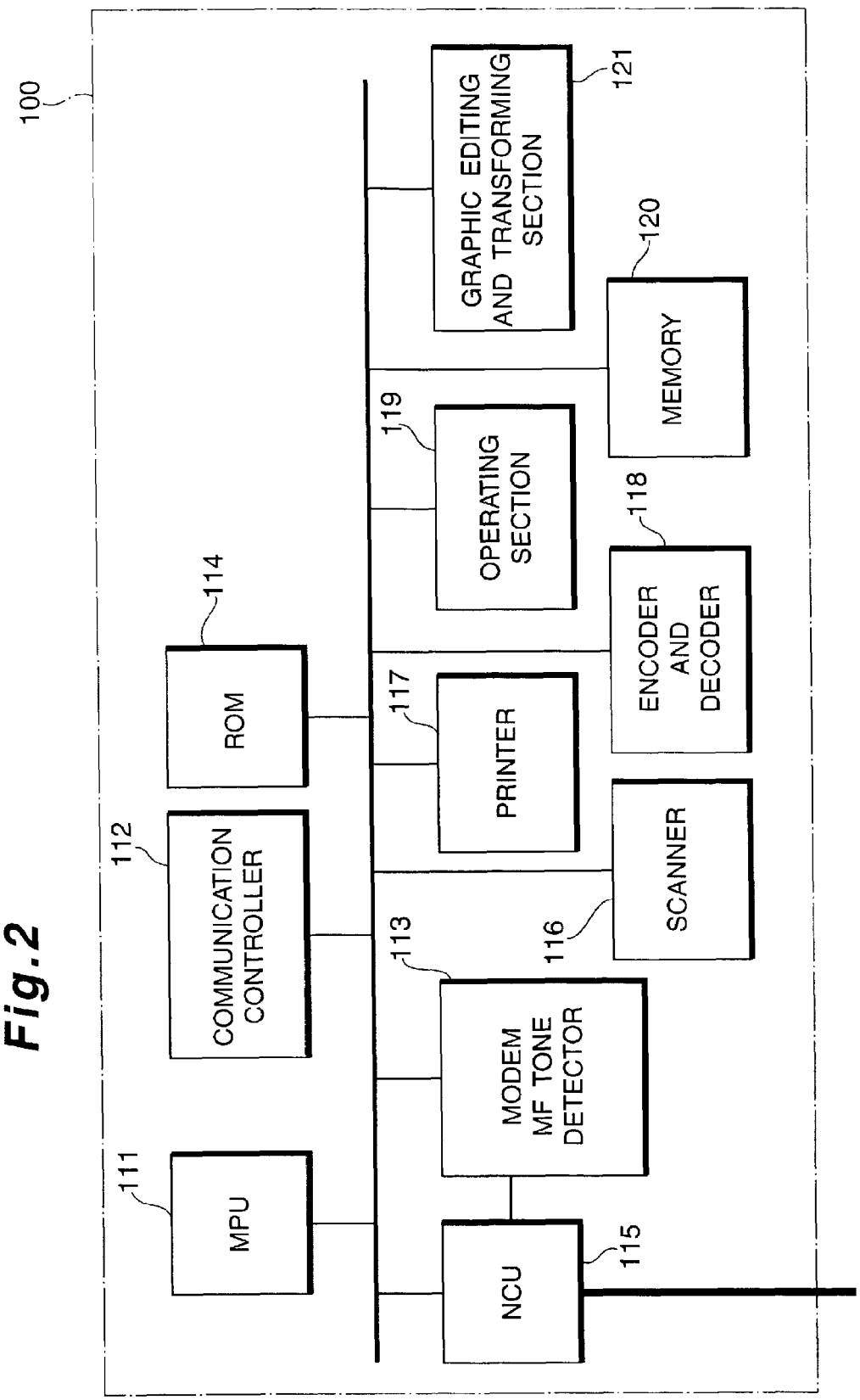
FIG. 2 is a block diagram showing Embodiment 1 of the communication device of the sender.

FIG. 2 shows a detailed configuration of the sender's communication device 100.

The device in FIG. 2 comprises MPU 111, communication controller 112, modem MF (Multi Frequency) detector 113, ROM 114, NCU 115, scanner 116, printer 117, encoder and decoder 118, operating section 119, memory 120, and graphic editing and transforming section 121. Here, the correspondence of each function block in FIG. 1 is as follows. The MPU 111, communication controller 112, modem MF detector 113, ROM 114, NCU 115, encoder and decoder 118, and graphic editing and transforming section 121 correspond to data sending and receiving controller 104 in FIG. 1. Moreover, scanner 116 corresponds to data generating section 101 in FIG. 1. Further, MPU 111, communication controller 112, ROM 114, operating section 119, memory 120, and graphic editing and transforming section 121 correspond to appended information holding section 103 in FIG. 1. And, memory 120 corresponds to data container 102 in FIG. 1.

In FIG. 2, MPU (Micro Processor Unit) 111 is a processor for controlling each part of sender's communication device 100.

The communication controller 112 is what controls communication protocol such as transmission rate or graphic resolution.

The modem MF tone detector 113 is what modulates sending data and demodulates receiving data, and besides detects DTMF (Dial Tone Multi Frequency).

ROM 114 is a memory for containing software which functions as facsimile executed by MPU 111.

NCU (Network Control Unit) 115 is a network controlling device to send out dial signal for calling out communication partner at the other end.

The scanner 116 is what reads manuscript optically and transforms it into electric signal.

The printer 117 is what prints out the received data.

The encoder and decoder 118 are what encode (compress) graphic data put out from the scanner 116 and what decode (extend) the received graphic data. Here, either of such codes as MH/MR/MMR is used in encoding. That is modified Huffman code/modified READ (Relative Element Address Designate) code/modified modified READ code.

The operating section 119 comprises a numerical keyboard, a display etc. The numerical keyboard is used for inputting access number of polling or graphic mode by the operator of sender. The display is a LCD to present messages for the operator.

The memory 120 is used for containing sending data or received data.

The graphic editing and transforming section 121 is what transforms resolution of graphics conserved in the memory 120.

Figure 3:
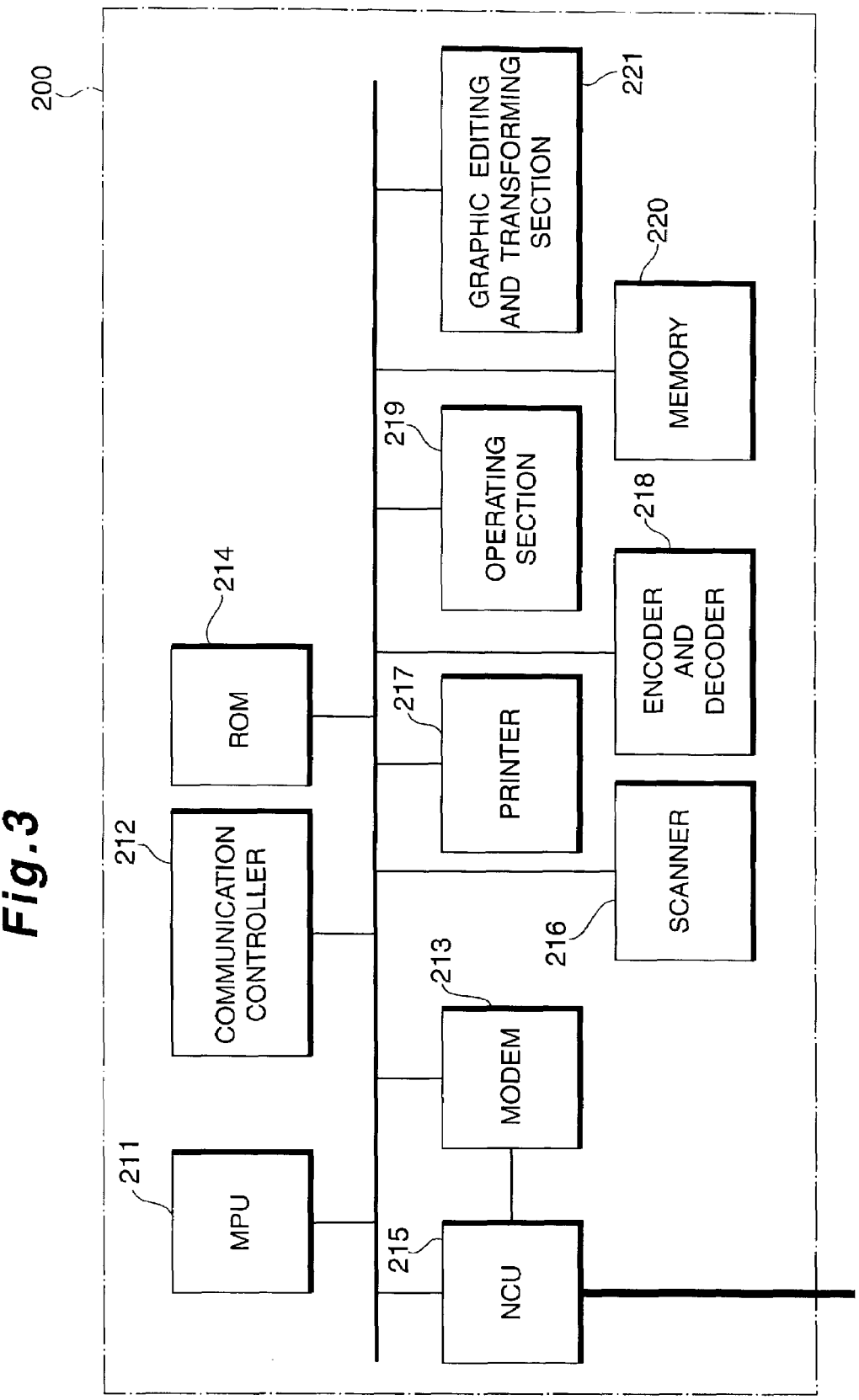
FIG. 3 is a block diagram showing Embodiment 1 of the communication device of the receiver.

FIG. 3 shows a detailed configuration of the receiver's communication device 200.

The device in FIG. 3 comprises MPU 211, communication controller 212, modem 213, ROM 214, NCU 215, scanner 216, printer 217, encoder and decoder 218, operating section 219, memory 220, and graphic editing and transforming section 221. Here, the correspondence with each function block in FIG. 1 is as follows. That is, MPU 211, communication controller 212, modem 213, ROM 214, NCU 215, encoder and decoder 218 and graphic editing and transforming section 221 correspond to the data sending and receiving controller 201 in FIG. 1. Moreover, operating section 219 corresponds to the re-send request indicator 203. Further, printer 217 corresponds to the data outputting section 202.

The basic function of each part of the receiver's communication device in FIG. 3 is same as each part of the sender's communication device in FIG. 2. That is, MPU 211 is a processor for controlling each part of the receiver's communication device 200.

The communication controller 212 has a function of controlling communication protocol such as transmission rate or graphic resolution etc.

The modem 213 has a function of modulating and demodulating of the sending data and received data.

ROM 214 is a memory for containing software executed by MPU 211 which functions as facsimile.

NCU 215 is a network controlling unit for sending out dial signal to call out the communication partner at the other end of the line.

The scanner 216 has a function of reading manuscript optically and transforming the obtained quantity of light into electric signal.

The printer 217 has a function of printing out the received data and its mode information.

The encoder end decoder 218 have functions of encoding the graphic data put out from scanner 216 or decoding the received graphic data.

The operating section 219 comprises an operating panel for being inputted access number for polling or reading mode by the receiver. And, it also comprises a LCD for presenting message to the receiver.

The memory 220 is used for containing sending data or received data.

The graphic editing and transforming section 221 has a function of transforming the resolution of graphics conserved in the memory 220.

<Operation>

Figure 4:
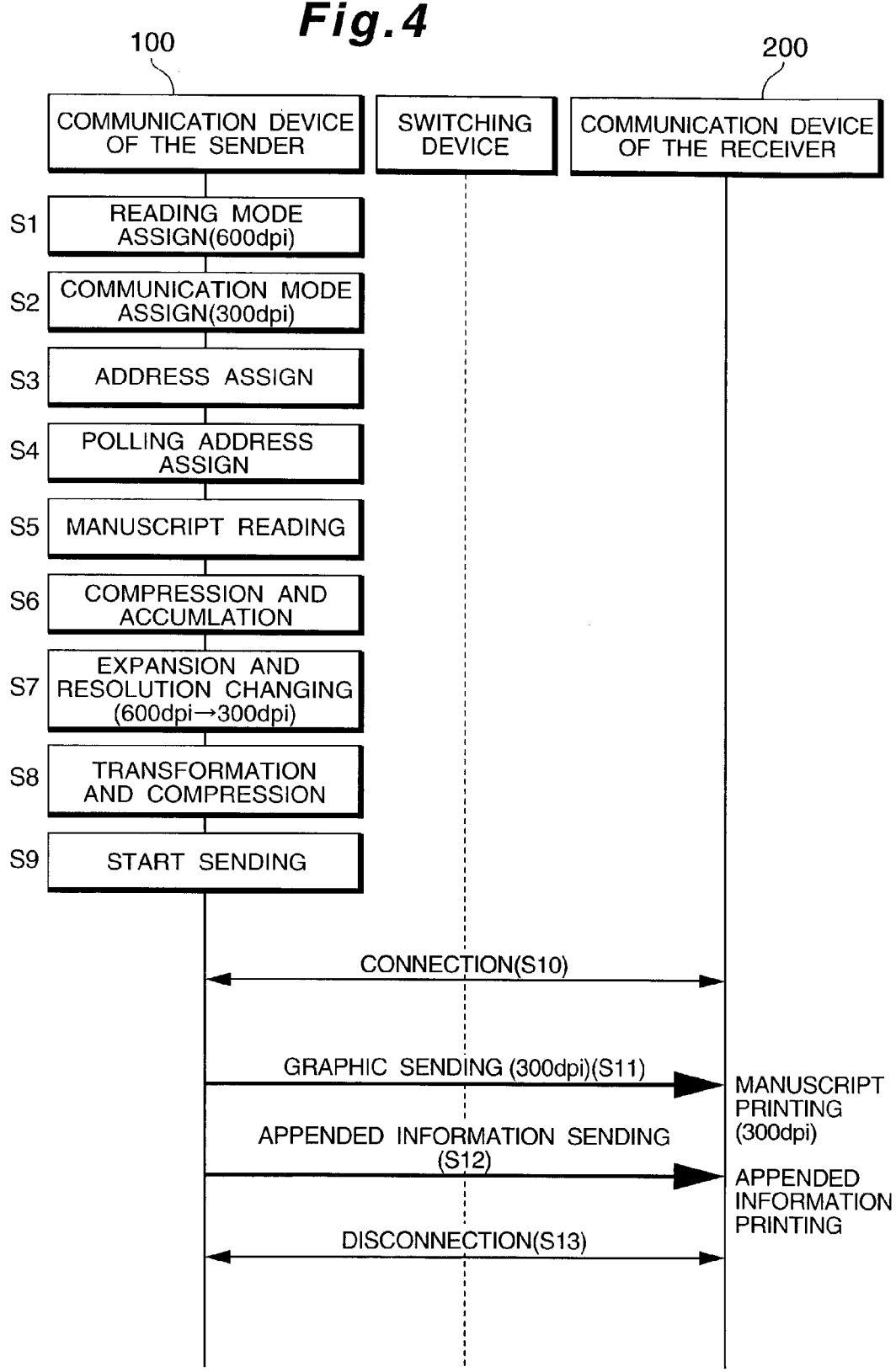
FIG. 4 is a sequence chart showing the sending process of Embodiment 1.

FIG. 4 shows a sending sequence of Embodiment 1.

In FIG. 4, an operation for sending graphics is performed by an operator at the sender's communication device 100. In this occasion, the operator, at first, sets a manuscript at the scanner 116 (that is, data generating section 101 in FIG. 1). And, the operator assigns reading mode, communication mode, FAX number of sending address, and access number for polling (FAX number of the sender's communication device 100) respectively (step S1 to S4). At this time, for example, 600 dpi is assigned as reading mode and 300 dpi is assigned as communication mode.

A manuscript is read at 600 dpi by the scanner 116 (step S5). Then, the sending and receiving controller 104 in FIG. 1 at first compress the graphic data of this resolution by the encoder and decoder 118. And, the compressed data is accumulated in the memory 120 (data container 102 in FIG. 1). Moreover, in step S6, an ID is attached to the accumulated graphic data to identify it. At the same time, mode information is compiled for being attached to the graphic data when it is sent. And, it is also contained in memory 120. These graphic data and its corresponding mode information are linked in memory 120.

Next, the data sending and receiving controller 104 takes out the graphic data from the memory 120. And, it is transformed from extended graphics of 600 dpi into sending mode graphics of 300 dpi. Then, it is compressed by the encoder and decoder 118 again (step S7). On the other hand, the mode information for sending such as resolution which is able to be sent by polling, ID number of accumulated graphics, and access number for polling sending are transformed. And, these appending data for polling are compressed by the encoder and decoder 118 (step S8).

And, the data sending and receiving controller 104 starts sending these graphic data and appending data for polling, via modem MF (multi-frequency) tone detector and NCU 115 (step S9). In this occasion, the communication protocol is made by communication controller 112. Here, the sender assigns 300 dpi of actual sending resolution to the receiver.

When the sender's communication device 100 started sending in step S9, connection for communication is performed according to facsimile procedure known in public (step S10). Then, graphic sending of graphic data and graphic sending of appending data for polling are performed (steps S11 and S12). When the sending ended, the communication is disconnected by the procedure known in public (step S13).

The data in communication protocol is received by the receiver's communication device 200 via NCU 215 and modem 213. Here the resolution assigned in communication mode is 300 dpi. So, the data sending and receiving controller 201 extends the compressed data of this resolution by using encoder and decoder 218. And, the extended data is printed by printer 217. Moreover, the graphic data of appending data for polling which is sent succeedingly after the manuscript graphics is also printed.

FIG. 5 shows an example of printing of appending data for polling.

As shown in FIG. 5, those printed out as appending data for polling are a graphic ID for identifying the graphics sent by the sender, a graphic mode which is able to be sent from the sender's communication device 100, and address number for polling in occasion of requesting for re-sending.

Next, the operation processed in the occasion when higher resolution is requested is described. This operation is done because the resolution of received graphics is not enough for satisfying the receiver.

Figure 6:
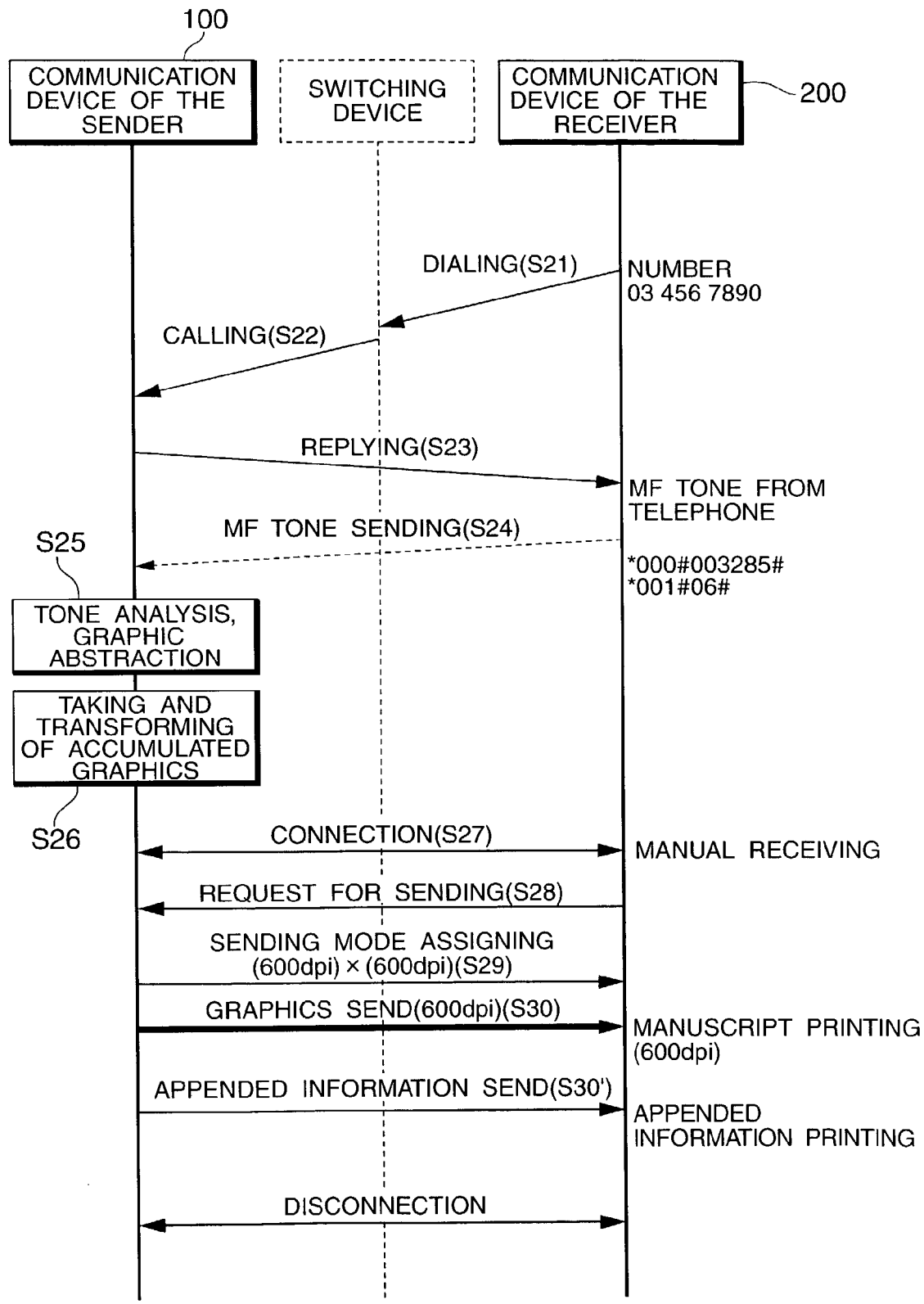
FIG. 6 is a sequence chart showing the sending request process by polling.

FIG. 6 shows a sequence of this kind of operation.

At first, the operator at receiver's communication device 200 inputs the assigned address number for polling with operating section 219. By this, the data sending and receiving controller performs dialing operation in a certain procedure (step S21). Thus, a calling for the sender's communication device 100 is performed by the receiver's communication device 200 via switching device (step S22). And, the calling accepting terminal (sender's communication device 100) replies to it according to communication procedure known in public (step S23).

In the receiver's communication device 200, MF tone corresponding to the graphics requested for re-sending is sent out when the sender's communication device 100 that is calling accepted terminal replied (step S24). That is, by using operating panel of the operating section 219, MF tone of *000#0003285# as ID (identification) of graphics and MF tone of *001#06# as mode information representing resolution of 600 dpi×600 dpi are sent out.

In the sender's communication device 100 where the re-sending request is accepted, next process is performed. That, the data sending and receiving controller 104 makes the modem MF tone detector 113 analyze the MF tone when it is received via NCU 115. And, the graphic ID number and graphic mode selecting number are abstracted from it (step S25). Next, the data sending and receiving controller 104 takes out graphics corresponding to the abstracted graphic ID number from the memory 120. And, graphic transformation which is necessary for sending data at assigned graphic mode is performed by graphic editing and transforming section 121 (step S26). That is, the graphics is transformed with the resolution of 600 dpi. And, it is encoded by encoder and decoder 118.

Here, what is described is the re-sending assignment by MF tone. But, the re-sending can also be performed by sending a setting information of re-sending with the header information assigning for re-sending.

Moreover, connection of communication between the sender's communication device 100 and the receiver's communication device 200 according to a certain communication procedure at the same time when the process in the sender's communication device 100 is performed (step S27). And, manual receiving operation is performed in the receiver's communication device 200. After this, sending request is performed in the receiver's communication device 200 (step S28).

By these operation, in the sender's communication device 100 where the preparation for sending is completed, the data sending and receiving controller 104 assigns sending mode of 600 dpi×600 dpi to the receiver's communication device 200 (step S29). After this, sending of graphics is performed (step S30).

In addition, instead of the process mentioned above, the communication between the sender and the receiver can be disconnected soon after sending out MF tone of re-sending request at step S24, if the sender's communication device 100 memorizes the graphic ID and the address number sent from the receiver's communication device 200. And, the communication is connected so as to re-send graphics when the preparation for re-sending graphics is completed at the sender's communication device 100. By this method, the communication time is considerably shortened in the occasion when preparing for sending graphics spend much time.

FIG. 7 shows the data format of sending graphics.

In the format shown in FIG. 7, the graphic data is accompanied with graphic mode as well as graphic ID. And, examples of graphic mode are resolution and compression form.

Back to FIG. 6, the sender's communication device 100 also sends the appending data for polling (c.f. FIG. 5) when re-sending is performed (step S30'). Thus, the graphics of appending data for polling is printed at the receiver's communication device 200 as well as the graphics of 600 dpi is printed. In this occasion, appending data can be presented at a display instead of being printed.

By this operation, the receiver's communication device 200 can perform polling sending request for communication mode such as resolution other than what was applied to the former communication, so as to request for re-sending the same graphics of manuscript which is accumulated in the sender's communication device 100.

<Effect>

As mentioned above, according to Embodiment 1 of the communication device of present invention, the sender's communication device 100 sends appending data graphics which include ID of sending manuscript, graphic resolution and address number for polling. And, when the operator at the receiver's communication device 200 wants to receive the graphics with graphic resolution which is different from the resolution used in the former receiving, polling according to the received graphics of appended data is performed by the receiver's communication device 200. Therefore, the sender's communication device 100 can usually send graphics with communication mode of comparatively low resolution as far as higher resolution graphics is not requested from the receiver. And, if it is requested then higher resolution graphics is sent for the first time. So, communication cost as a whole can be kept down. Moreover, there is an effect that the operator at the sender's communication device 100 does not need to perform any operation in the occasion of re-sending graphics with higher resolution. On the other hand, the operator at the receiver's communication device 200 can easily request to the sender's communication device 100 because the operator can use the appended data received from the sender's communication device 100 to make a request for different resolution of graphics.

Embodiment 2

In Embodiment 2, each accumulated graphics in the sender's communication device 100 of Embodiment 1 is given period of keeping accumulation. And, this information of period is also sent as appending data of sending data. That is, each period of keeping graphic data is limited in Embodiment 2. If the sender's device keeps accumulating graphics without limitation of period, as the time passes the capacity left in the memory decreases until the memory is filled up. So, either of graphics kept in the memory must be deleted at this time of filling up of the memory. But, in this occasion, the period of being kept in the memory differs with situation of communication. And, the receiver cannot realize until when it can request for re-sending graphics. Therefore, in Embodiment 2, the period is fixed and it is informed to the receiver.

<Configuration>

Figure 8:
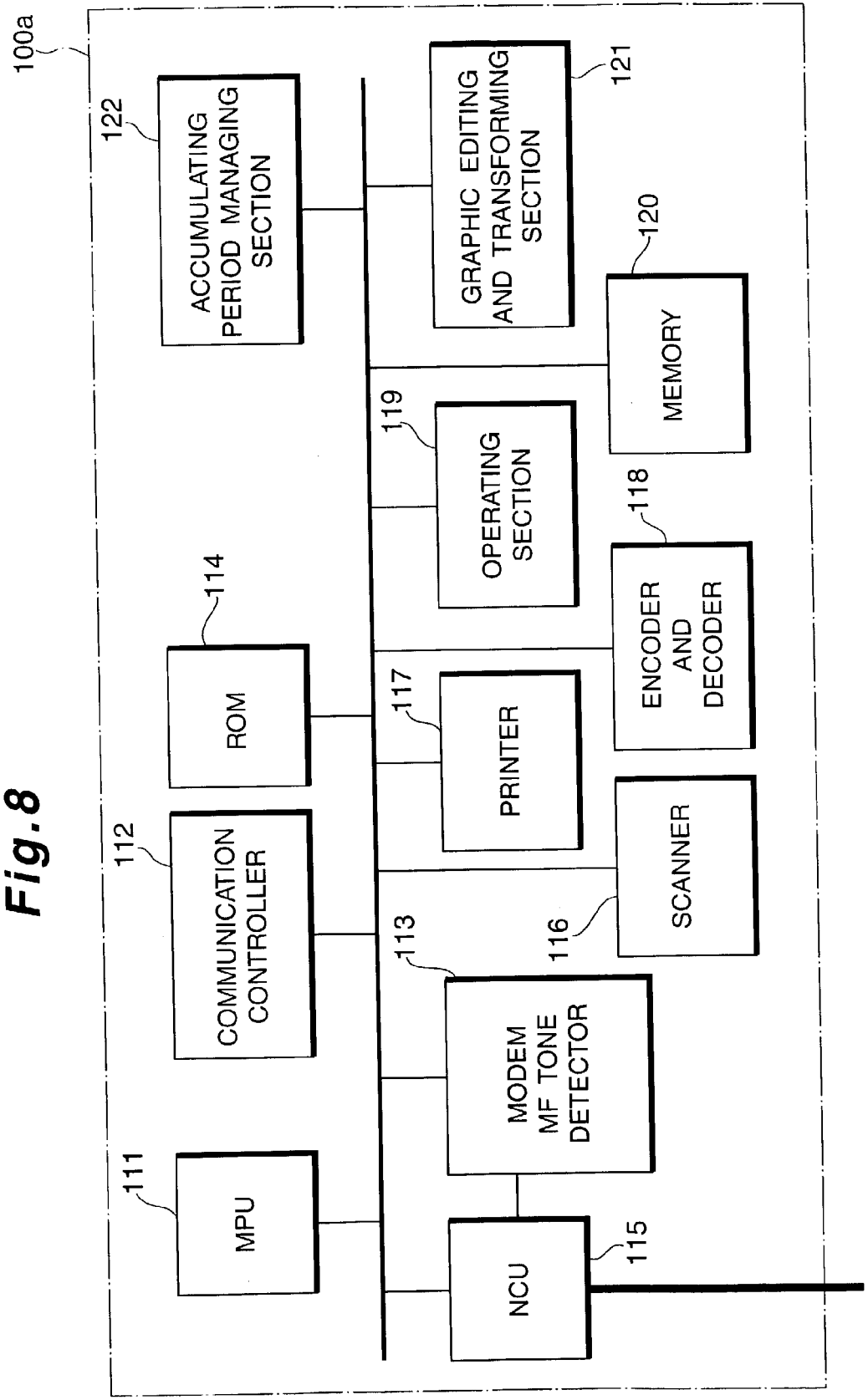
FIG. 8 is a block diagram showing Embodiment 2 of the communication device of the sender.

FIG. 8 shows the configuration of sender's communication device 100a of Embodiment 2.

The device in FIG. 8 comprises MPU 111, communication controller 112, modem MF tone detector 113, ROM 114, NCU 115, scanner 116, printer 117, encoder and decoder 118, operating section 119, memory 120, graphic editing and transforming section 121, and accumulating period managing section 122. Here, elements from MPU 111 to graphic editing and transforming section 121 are same as the corresponding elements in Embodiment 1. So, the same description is omitted.

However, in Embodiment 2, accumulating period of graphic data managed by accumulating period managing section 122 is made up to be sent being included in appending data of sending data. So, the data sending and receiving controller of Embodiment 2 (being omitted in the drawings) has this function as well as the same function of Embodiment 1. The whole function of this controller is realized by MPU 111 to NCU 115, encoder and decoder 118 and graphic editing and transforming section 121.

Moreover, the accumulating period managing section 122 has a function of managing accumulating period of graphic data in the sender's communication device 100a. That is, it has a clock function indicating present date and time. And, it compares the present date and time with the accumulating period of graphic data, for example, at each prescribed interval of time. If the present date and time reached the accumulating period, then the accumulating graphic data corresponding to the period is deleted from memory 120. The accumulating period managing section 122 is made up for performing this function. In addition, as for the receiver's communication device, it is same as that of Embodiment 1. So, hereafter the configuration shown in FIG. 3 is referred in description of Embodiment 2.

<Operation>

The operator at sender's communication device 100a performs operation of sending graphics. In this occasion, the operator assigns each effective period of accumulating graphics with operating section 119 when the operator sets manuscript at scanner 116 in Embodiment 2, as well as reading mode, communication mode, FAX number of sending address, and access number for polling (FAX number of sender's communication device 100). At this time, for example, 600 dpi is assigned as reading mode, and 300 dpi is assigned as communication mode.

Thus, a manuscript is read at 600 dpi by scanner 116. Then, the graphic data of this resolution, at first, is compressed by encoder and decoder 118. And, it is accumulated in memory 120. Moreover, graphic ID for identifying this accumulating graphic data is attached to the graphic data.

FIG. 9 shows the format of graphic data.

As shown in FIG. 9, graphic ID, effective period of graphics (as for this example, 11/30/2001 12:00 is inputted via operation panel of operating section), and mode information such as graphic resolution etc. are attached to the graphic data.

Next, the data sending and receiving controller takes out graphic data from memory 120. And, the graphic data is extended into bitmap data by encoder and decoder 118. Then, the graphic editing and transforming section 121 transforms the extended graphics of 600 dpi into the sending mode graphics of 300 dpi. And, it is compressed by encoder and decoder 118. These processes for sending graphics are same as Embodiment 1.

Moreover, the graphic editing and transforming section 121 transforms the graphics of sending mode information such as resolution etc. which is able to be sent by polling, ID number of the accumulated graphics, access number for polling, and effective period of accumulated graphics. And, these appending data for polling are compressed by encoder and decoder 118.

And, the data sending and receiving section starts sending theses graphic data and graphics of appending data for polling via modem MF tone detector 113 and NCU 115. In this occasion, the communication protocol is made by communication controller 112. Here, the sender assigns the resolution of 300 dpi to the receiver, so as to use it in actual sending.

The operation after the sender's communication device 100 started sending is same as Embodiment 1.

The receiver's communication device 200 receives graphic data and appended data for polling, so as to print these data, as same as Embodiment 1.

FIG. 10 shows an example of printing of appended data for polling.

As shown in FIG. 10, the effective period of accumulated graphics is printed out as appended data for polling, as well as graphic ID for identifying graphics sent by the sender, graphic mode which is able to be sent by the sender's communication device 100a, and address number for polling to request for re-sending.

Next, the operation performed when the operator at sender's communication device 200 is not satisfied with the resolution of received graphics and wants to receive it with higher resolution is described.

In this occasion, basic operation is same as Embodiment 1. However, the re-sending request by polling with preferred mode is performed only within effective period of accumulating graphics which is informed by the sender. By the way, the re-sent data can be deleted from the data container. Or, instead, it can be always kept containing until the effective period ends.

Moreover, the operation of sender's communication device 100a which received re-sending request is same as Embodiment 1. So, the description is omitted here. However, when re-sending request of graphics is received after the effective period expired, the graphics is already deleted from memory 120. Therefore, the data sending and receiving controller of sender's communication device 100a sends an error message to the receiver's communication device 200. Moreover, instead, it can inform the operator at the sender's communication device 100a of the re-sending request for the deleted data.

Next, the management of the accumulated graphics with its effective period which is set to each accumulated graphics beforehand in the sender's communication device 100a is described.

Figure 11:
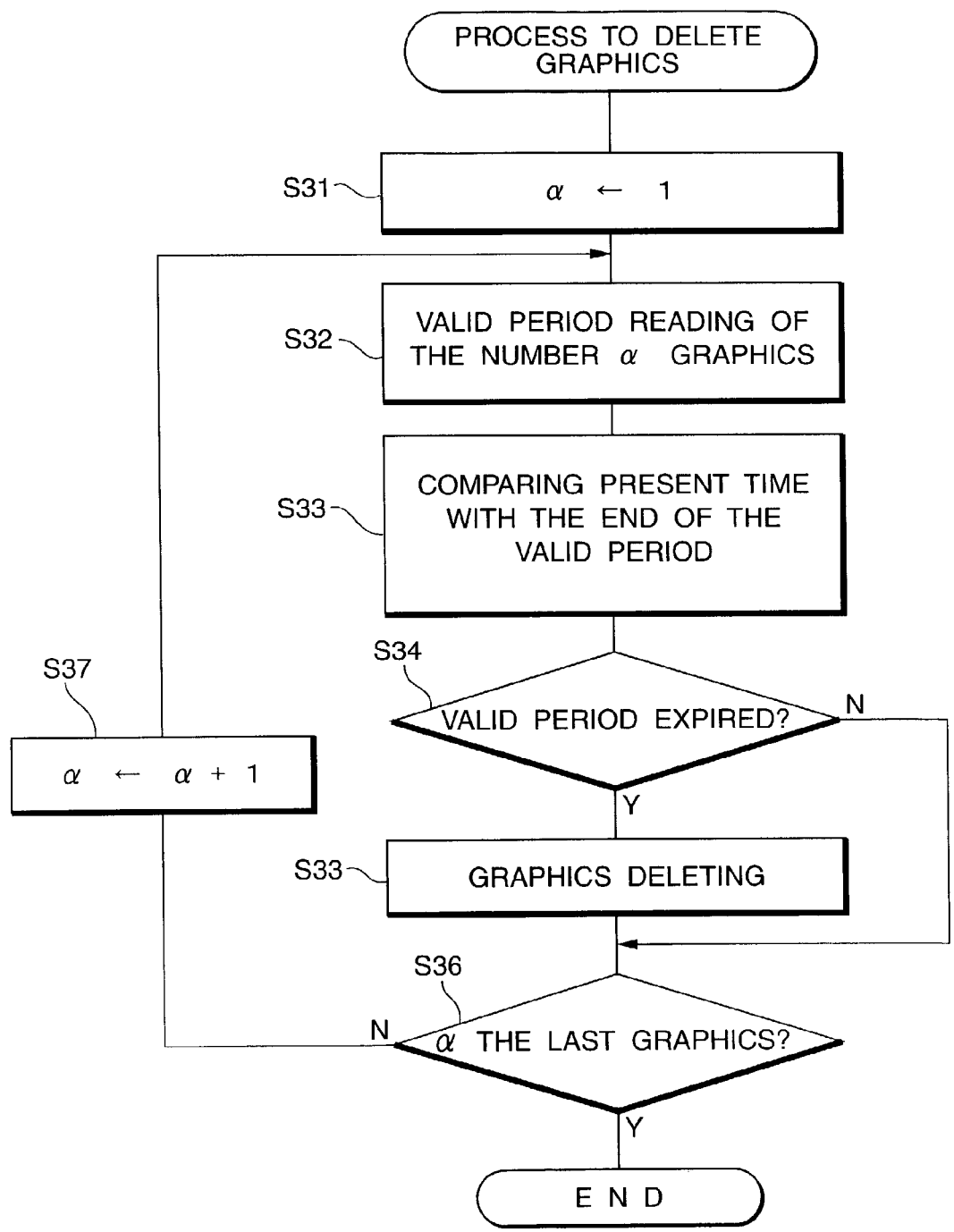
FIG. 11 is a flowchart showing a process of accumulated graphics management.

FIG. 11 shows a flowchart about the management of accumulated graphics.

The accumulating period managing section 122 performs process of judging period for accumulating graphics periodically such as every day or every prescribed interval of time etc. Or, instead, it can perform process of judging period for accumulating graphics at the instant of time when the graphics of manuscript is sent or received.

As for the process of judging period for accumulating graphics, at first, it is performed for the first graphics accumulated in memory 120 (step S31). And, accumulating period information is read out of this accumulating graphics data (step S32). Next, the present date and time shown by the clock provided in accumulating period managing section 122 is compared with the accumulating period (step S33, S34). If the accumulating period is expired in step S34, the corresponding graphic data accumulated in memory 120 is deleted (step S35). And, whether the dealing graphics is the last or not is judged (step S36). If it is not the last, the dealing graphic number α is increased with "1" (step S37). And, the process returns to step S32, so as to repeat the same process mentioned above. Moreover, if the accumulating period is not expired in step S34, the process goes to step S36. If the dealing graphics is the last of the accumulated graphics, the process ends.

<Effect>

As mentioned above, according to the sender's communication device of Embodiment 2, the device is made up for managing period of accumulating graphics and the graphics which period is expired is deleted, as well as performing same process as Embodiment 1. Therefore, graphics left for a long time in memory can be deleted and the memory can be used only for keeping useful data. Moreover, the accumulating period is set to each graphics. Therefore, optimum period is set to each graphics such as setting period according to importance of the graphics etc. Further, in the receiver's communication device, the effective period when receiving by polling is possible can be informed about every graphics. Therefore, the receiver can receive the necessary graphics certainly by performing polling reception within the period.

Other Embodiment

In each Embodiment mentioned above, resolution of data is described as an example of graphic mode which is different between the received data and the re-sending data. But, as some examples other than this, density of graphics (for example thickness of lines), gradation data or bitmap data, monochrome or color (for example in occasion when the receiver received RGB data and wants to receive only B data) etc. are adopted as same as resolution. Further, as other examples, transmission rate (baud rate) which is able to be received, page assignment from plural pages of sending manuscript which is requested for re-sending etc. are adopted.

In each Embodiment mentioned above, as necessary data to request for polling sending; graphic ID, graphic mode which is able to be sent, address to request for polling sending etc. are transformed into character data and put it on the sending graphics to inform. But, as method of informing other method than this can be adopted. For example, method of using communication mode provided by specific manufacturing company, such as NSF, NSS can be adopted. Or, instead, other communication method such as e-mail can be adopted so as to make up for informing at e-mail address being set beforehand corresponding to the sender's facsimile device. Further, as for the method of requesting for polling sending, other method such as using NCS etc. can be adopted.

Moreover, in Embodiment 2, accumulation of graphics can be managed by the number of access times from the receiver's communication device 200 as well as accumulating period. That is, the configuration for this kind of management is as follows. The limit of access times, for example 3 times is set beforehand. And, it is informed to the receiver's communication device 200. When the receiver's access times reached to this limit, the graphics is deleted from the memory 120 of sender's communication device 100a even if the present time is within the accumulating period. Further, in Embodiment 2, not only adopt the method of inputting accumulating period for each graphics by the operator, but also the method of deciding it by the accumulating period managing section 122 according to quantity of graphic data (for example, shorter period for larger quantity), capacity left in the memory, (for example, longer period for larger capacity left, or shorter period for older data when capacity left is small) or kind of graphics (for example, as for initial setting, the period is decided to one week from the sending date).

What is claimed is:

1. A communication device, comprising:
   a scanner to read graphic data from a document,
   a data container to contain data to be sent to another communication device, the data including the graphic data read from the document,
   an appending information holding section to hold appended information corresponding to the data to be sent, the appended information including sending mode information that identifies a plurality of sending modes, ID information that identifies the graphic data read from the document using a designation that is smaller in size than the graphic data read from the document, and a fax number for the communication device, wherein the sending modes including at least a first sending mode and a second sending mode, and a data sending and receiving controller to retrieve the data from the data container and the appended information from the appending information holding section, and to send the retrieved data and appended information to the another communication device in the first sending mode along with the appended information and, if a data re-sending request based on the appended information is received from the another communication device, for taking data identified by the ID information out of the data container and re-sending it to the another communication device in the second sending mode, wherein the re-sending request contains a designation of said second sending mode based on said sending mode information in said appended information, and wherein the data sending and receiving controller includes a graphic editing and transforming section that transforms the data taken out of the data container after the re-sending request in accordance with the second sending mode.

2. A communication device according to claim 1, wherein the data re-sending request sent from the another communication device includes data form information which indicates a data form for re-sending, and wherein the data sending and receiving controller transforms the data form of the data in the data container according to the data form information, so as to re-send it.

3. A communication device according to claim 2, wherein the data form of the data to be re-sent is different from the data form of the data previously sent.

4. A communication device according to claim 1, wherein the data re-sending request includes page assigning information of the data to re-send, and wherein the data sending and receiving controller takes out the assigned page of the data according to the page assigning information.

5. A communication device according to claim 1, wherein the data sending and receiving controller starts re-sending as a communication line is kept connected when re-sending is requested by the another communication device.

6. A communication device according to claim 1, wherein the data sending and receiving controller temporarily disconnects a communication line after memorizing the re-sending request information when re-sending is requested by the another communication device, so as to start re-sending later.

7. A communication device according to claim 1, wherein the data contained in the data container has a valid period, wherein the appended information includes valid period information, and wherein data for which the valid period has expired is deleted.

8. A communication device according to claim 7, wherein the another communication device is informed of an error if the another communication device requests re-sending of the deleted data.

9. A communication device according to claim 7, wherein the valid period is varied according to an importance assigned to the data.

10. A communication device according to claim 7, wherein the valid period is varied according to the quantity of the data.

11. A communication device according to claim 7, wherein the valid period is varied according to the quantity of vacant memory capacity in the data container.

12. A communication device according to claim 1, wherein the data sending and receiving controller deletes data which was re-sent to the another communication device from the data container.

13. A communication device according to claim 1, wherein the data re-sending request is sent by multi-frequency tone.

14. A communication device according to claim 1, wherein the sending mode information includes a color designation.

15. A communication device according to claim 1, wherein the sending mode information includes a density designation for the data that is to be re-sent.

16. A communication device according to claim 1, wherein the appended information is sent as print data.

17. A communication device according to claim 1, wherein the data is sent at a first resolution in the first sending mode and at a second resolution in the second sending mode, the second resolution being higher than the first resolution.

18. A communication device according to claim 1, wherein both the communication device and the another communication device are fax machines.

19. A communication device, comprising:

a scanner to read graphic data from a document, a data container to contain data to be sent to another communication device, the data including the graphic data read from the document and the another communication device including a printer, an appending information holding section to hold appended information corresponding to the data to be sent, the appended information including sending mode information that identifies a plurality of sending modes, ID information that identifies the graphic data read from the document using a designation that is smaller in size than the graphic data read from the document, and a fax number for the communication device, wherein the sending modes including at least a first sending mode and a second sending mode, and a data sending and receiving controller to retrieve the data from the data container and the appended information from the appending information holding section, and to send the retrieved data and appended information to the another communication device in the first sending mode along with the appended information and, if a data re-sending request based on the appended information is received from the another communication device, for taking data identified by the ID information out of the data container and re-sending it to the another communication device in the second sending mode, wherein the re-sending request contains a designation of said second sending mode based on said sending mode information in said appended information, and wherein the data sending and receiving controller includes a graphic editing and transforming section that transforms the data taken out of the data container after the re-sending request in accordance with the second sending mode, and wherein the data sending and receiving controller temporarily disconnects a communication line after memorizing the re-sending request information when re-sending is requested by the another communication device, so as to start re-sending later.

20. A communication device according to claim 19, wherein the data re-sending request sent from the another communication device includes data form information which indicates a data form for re-sending, and wherein the data sending and receiving controller transforms the data form of the data in the data container according to the data form information, so as to re-send it.

21. A communication device according to claim 20, wherein the data form of the data to be re-sent is different from the data form of the data previously sent.

22. A communication device according to claim 19, wherein the data re-sending request includes page assigning information of the data to re-send, and wherein the data sending and receiving controller takes out the assigned page of the data according to the page assigning information.

23. A communication device according to claim 19, wherein the data contained in the data container has a valid period, wherein the appended information includes valid period information, and wherein data for which the valid period has expired is deleted.

24. A communication device according to claim 23, wherein the another communication device is informed of an error if the another communication device requests re-sending of the deleted data.

25. A communication device according to claim 23, wherein the valid period is varied according to an importance assigned to the data.

26. A communication device according to claim 23, wherein the valid period is varied according to the quantity of the data.

27. A communication device according to claim 23, wherein the valid period is varied according to the quantity of vacant memory capacity in the data container.

28. A communication device according to claim 19, wherein the data sending and receiving controller deletes data which was re-sent to the another communication device from the data container.

29. A communication device according to claim 19, wherein data is sent at a first resolution in the first sending mode and at a second resolution in the second sending mode, the second resolution being higher than the first resolution.

30. A communication device according to claim 19, wherein the sending mode information includes a color designation.

31. A communication device according to claim 19, wherein the sending mode information includes a density designation for the data that is to be re-sent.

32. A communication device, comprising:
a scanner to read graphic data from a document,
a data container to contain data to be sent to another communication device, the data including the graphic data read from the document and the another communication device including a printer,
an appending information holding section to hold appended information corresponding to the data to be sent, the appended information including sending mode information that identifies a plurality of sending modes, ID information that identifies the graphic data read from the document using a designation that is smaller in size than the graphic data read from the document, and a fax number for the communication device, wherein the sending modes including at least a first sending mode and a second sending mode, and
a data sending and receiving controller to retrieve the data from the data container and the appended information from the appending information holding section, and to send the retrieved data and appended information to the another communication device in the first sending mode along with the appended information and, if a data re-sending request based on the appended information is received from the another communication device, for taking data identified by the ID information out of the data container and re-sending it to the another communication device in the second sending mode, wherein the re-sending request contains a designation of said second sending mode based on said sending mode information in said appended information, wherein the data sending and receiving controller includes a graphic editing and transforming section that transforms the data taken out of the data container after the re-sending request in accordance with the second sending mode, wherein the data contained in the data container has a valid period, wherein the appended information includes valid period information, wherein data for which the valid period has expired is deleted, and wherein the valid period is varied according to the quantity of vacant memory capacity in the data container.

33. A communication device according to claim 32, wherein the data re-sending request sent from the another communication device includes data form information which indicates a data form for re-sending, and wherein the data sending and receiving controller transforms the data form of the data in the data container according to the data form information, so as to re-send it.

34. A communication device according to claim 32, wherein the data form of the data to be re-sent, is different from the data form of the data previously sent.

35. A communication device according to claim 32, wherein the data re-sending request includes page assigning information of the data to re-send, and wherein the data sending and receiving controller takes out the assigned page of the data according to the page assigning information.

36. A communication device according to claim 32, wherein the data sending and receiving controller starts re-sending as a communication line is kept connected when re-sending is requested by the another communication device.

37. A communication device according to claim 32, wherein the data sending and receiving controller temporarily disconnects a communication line after memorizing the re-sending request information when re-sending is requested by the another communication device, so as to start re-sending later.

38. A communication device according to claim 32, wherein the another communication device is informed of an error if the another communication device requests re-sending of the deleted data.

39. A communication device according to claim 32, wherein the data sending and receiving controller deletes data which was re-sent to the another communication device from the data container.

40. A communication device according to claim 32, wherein the data is sent at a first resolution in the first sending mode and at a second resolution in the second sending mode, the second resolution being higher that the first resolution.

41. A communication devise according to claim 32, wherein the sending mode information includes a color designation.

42. A communication device according to claim 32, wherein the sending mode information includes a density designation for the data that is to be re-sent.

43. A communication device, comprising:
- a sending data storing section which stores sending data corresponding to data identification information;
- an appended information holding section which holds mode information indicating a plurality of data editing modes used for editing said sending data, the data editing modes being different functional modes the device can execute and having mode identifiers;
- an editing and transforming section which edits the sending data in a first one of the data editing modes;
- a data sending and receiving controller which sends the edited sending data to another communication device, together with appended information that includes at least the data identification information and the plurality of mode identifiers;
- wherein when the sending and receiving controller receives a re-sending request from the another communication device, the re-sending request including the data identification information and a second one of the mode identifiers included in the appended information, the editing and transforming section changes the sending data in accordance with the second one of the mode identifiers based on the mode information stored in the appended information holding section, and
- wherein the data sending and receiving controller sends the changed sending data to the another communication device.

44. A communication device according to claim 43, wherein the data editing modes include a low resolution mode and a high resolution mode.

45. A communication device according to claim 43, further comprising a scanner to generate the sending data by reading graphic data from a document, the data identification information including a code that corresponds to the graphic data read from the document.

46. A communication device according to claim 45, wherein the appended information that is send to the another communication device additionally includes a fax number of the communication device for use by the another communication device when sending the re-sending request.

* * * * *